United States Patent
Kaura et al.

(10) Patent No.: US 7,657,529 B2
(45) Date of Patent: Feb. 2, 2010

(54) METHOD OF PROVIDING SHARED OBJECTS AND NODE-SPECIFIC OBJECTS IN A CLUSTER FILE SYSTEM

(75) Inventors: Suchit Kaura, Santa Clara, CA (US); Neeraj Goyal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 278 days.

(21) Appl. No.: 10/810,174

(22) Filed: Mar. 26, 2004

(65) Prior Publication Data
US 2005/0216502 A1 Sep. 29, 2005

(51) Int. Cl.
*G06F 17/30* (2006.01)
*G06F 13/00* (2006.01)

(52) U.S. Cl. .......................................... 707/9; 711/100

(58) Field of Classification Search ............... 707/1–10, 707/100–104.1, 200–205; 709/200–213; 711/4–202
See application file for complete search history.

(56) References Cited

U.S. PATENT DOCUMENTS

| | | | | |
|---|---|---|---|---|
| 6,889,249 | B2 * | 5/2005 | Miloushev et al. ........... | 709/213 |
| 2002/0116593 | A1 * | 8/2002 | Kazar et al. ................. | 711/202 |
| 2003/0028514 | A1 * | 2/2003 | Lord et al. ..................... | 707/1 |
| 2003/0217119 | A1 * | 11/2003 | Raman et al. ............... | 709/219 |
| 2004/0128427 | A1 * | 7/2004 | Kazar et al. .................... | 711/4 |
| 2004/0133573 | A1 * | 7/2004 | Miloushev et al. ............ | 707/8 |
| 2004/0133577 | A1 * | 7/2004 | Miloushev et al. ........... | 707/10 |

\* cited by examiner

*Primary Examiner*—Hosain T Alam
*Assistant Examiner*—Navneet K Ahluwalia
(74) *Attorney, Agent, or Firm*—Townsend and Townsend and Crew LLP

(57) ABSTRACT

A method of providing shared objects and node-specific objects in a cluster file system is described and provided. The method includes providing to a particular shared object an attribute, whereas the particular shared object can be a container-type shared object. The attribute indicates any object created in the particular shared object (including its subdivisions or sub-containers) from this point in time will be designated as node-specific. Furthermore, when a node causes a file system operation that is node-specific to be performed by accessing the particular shared object, the file system operation is performed in an alternate directory corresponding to the node. The alternate directory supports a node-specific object. The shared objects and the node-specific objects can be directories. Additionally, the shared objects and the node-specific objects can be files.

19 Claims, 5 Drawing Sheets

METHOD OF PROVIDING SHARED OBJECTS AND NODE-SPECIFIC OBJECTS IN A CLUSTER FILE SYSTEM

BACKGROUND OF THE INVENTION

1. Field of the Invention

The present invention generally relates to cluster file systems. More particularly, the present invention relates to providing shared objects and node-specific objects in a cluster file system.

2. Related Art

Generally, a cluster file system is a shared file system. The cluster file system makes files visible to and accessible by the nodes in a cluster. Each node has the same view. It does not matter whether a file is stored on a device connected to all the nodes or on a device that is private to a single node. By maintaining cache coherency across the nodes, the cluster file system assures that all nodes at all times have the same view of the files in the cluster.

Although cluster file systems provide shared objects (e.g., a file or a directory) across the nodes, most cluster file systems do not provide the capability for node-specific objects such as files and directories. Some cluster file systems provide this functionality using node specific links. This requires that shared objects be duplicated in a node-specific directory. Moreover, these links are manually created.

SUMMARY OF THE INVENTION

A method of providing shared objects and node-specific objects in a cluster file system is described and provided. The method includes providing to a particular shared object an attribute, whereas the particular shared object can be a container-type shared object. The attribute indicates any object created in the particular shared object (including its sub-divisions or sub-containers) from this point in time will be designated as node-specific. Furthermore, when a node causes a file system operation that is node-specific to be performed by accessing the particular shared object, the file system operation is performed in an alternate directory corresponding to the node. The alternate directory supports a node-specific object. The shared objects and the node-specific objects can be directories. Additionally, the shared objects and the node-specific objects can be files.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

In a current implementation of a cluster file system, shared objects (e.g., files and directories) and node-specific objects (e.g., files and directories) are provided. In particular, there is no need to duplicate shared objects in a node-specific directory, which converts the status of the duplicated shared objects to node-specific objects. Instead, the shared objects maintain their status as shared objects while making node-specific those objects (e.g., file and directory) that need to be node-specific. That is, node-specific objects can have the same name but different content. This is useful when there is a need to have the same file name on different nodes but require a private or local copy on each node because node-specific information is stored in these files (e.g., configuration files).

A distinguishing factor of this invention is that it treats node-specific files/directories as inherent file system objects. The process of creating node-specific objects is automatic. This enables any new node that is added to the cluster supported by the cluster file system to automatically get the shared objects. Moreover, the cluster file system can start creating node-specific objects for the new node. This enables products to be installed on the cluster file system such that the binaries are shared but node-specific configuration files are created for each node to allow the products to run off the cluster file system.

Figure 1:
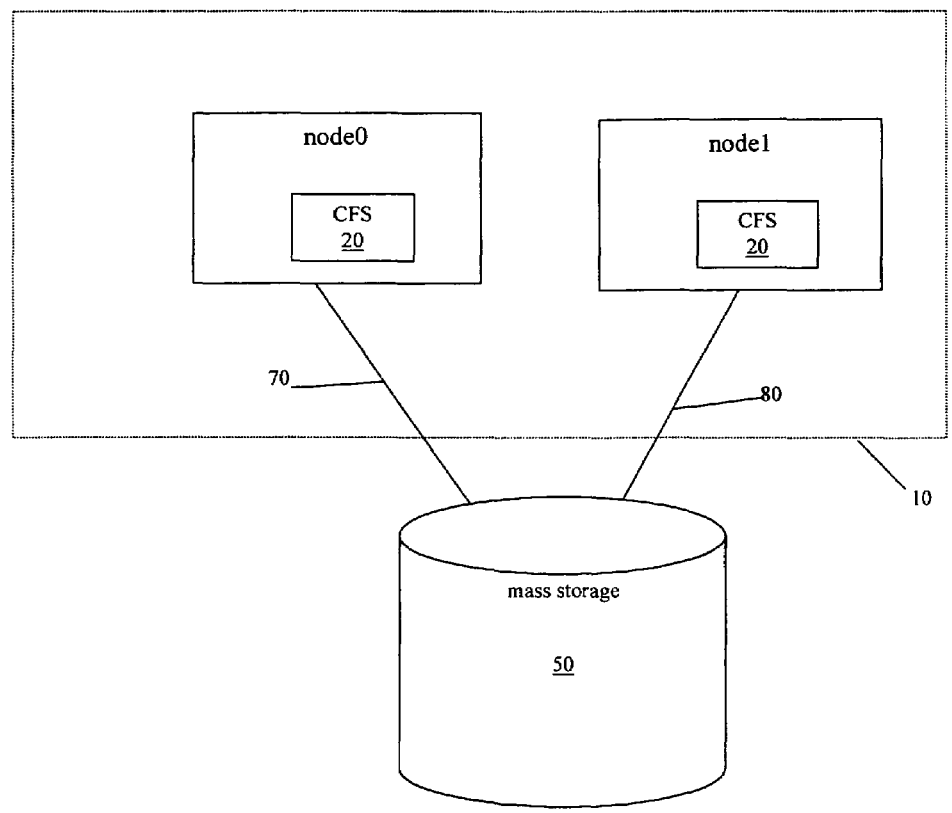
FIG. 1 illustrates a system in accordance with an embodiment of the present invention.

FIG. 1 illustrates a system 100 in accordance with an embodiment of the present invention. The system 100 includes a cluster 10 having a node0 and a node1. In an embodiment, each node can be any type of computer system. Moreover, the system includes a mass storage device 50 device shared by node0 and node1. The node0 is coupled to the mass storage device 50 via connection 70 while node1 is coupled to the mass storage device 50 via connection 80. Additionally, the system 100 includes a cluster file system 20 operating in node0 and in node1. The components of the system 100 can be implemented in hardware, software, or in a combination of hardware and software.

Figure 2:
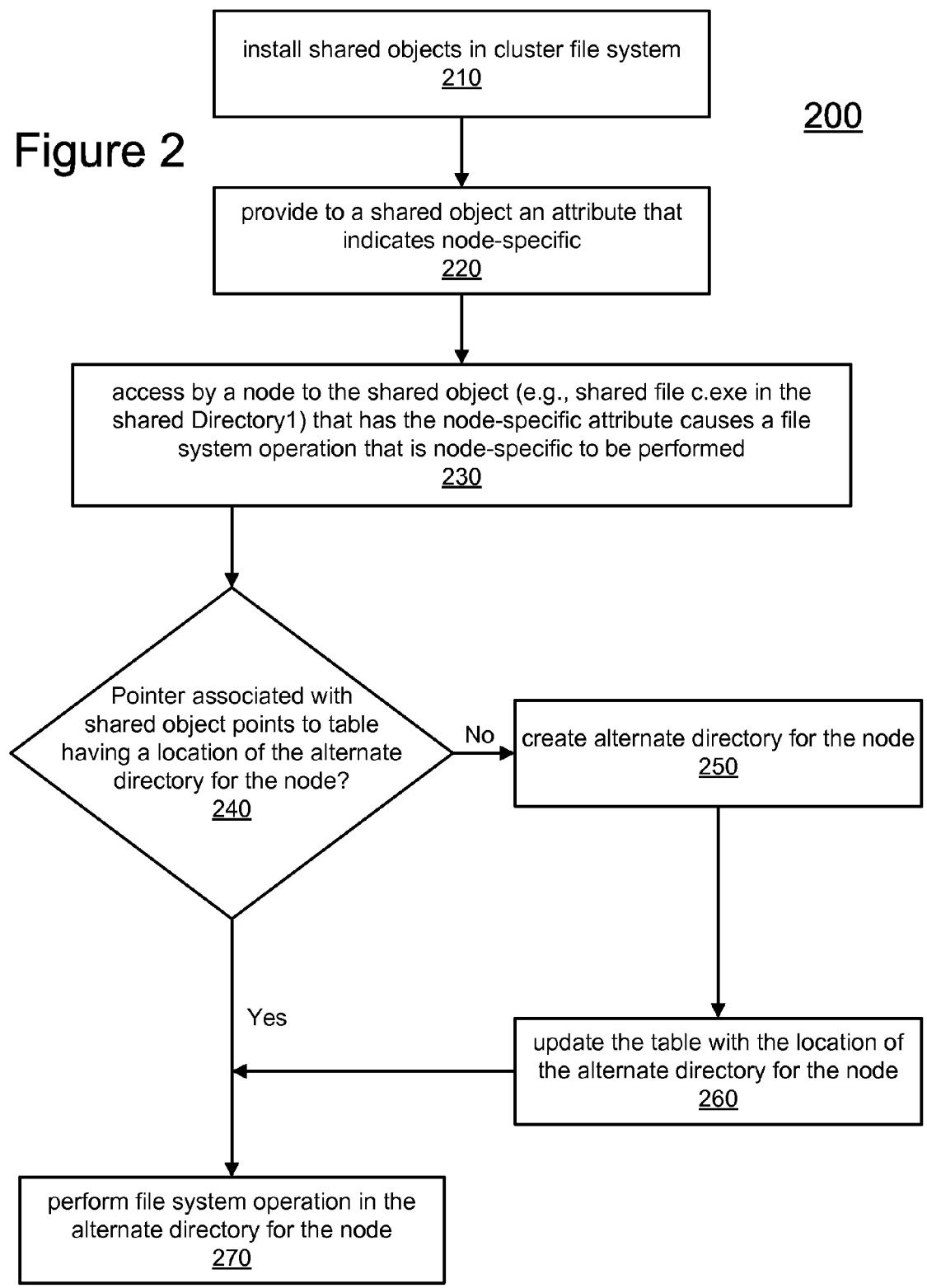
FIG. 2 illustrates a flow chart showing a method of providing shared objects and node-specific objects in a cluster file system in accordance with an embodiment of the present invention.

FIG. 2 illustrates a flow chart showing a method 200 of providing shared objects and node-specific objects in a cluster file system in accordance with an embodiment of the present invention. Reference is made to FIG. 1 and FIG. 3A-3C.

At Step 210, shared objects are installed in the cluster file system 20, which stores the shared objects in the mass storage device 50. The shared objects can be directories and files. Moreover, the shared objects will have the same name and the same content with respect to nodes (e.g., node0 and node1). At this time, there are no node-specific objects (e.g., files and directories). Hence, the directory search performed from node0 will provide the same results as the directory search performed from node1.

Continuing at Step 220, a shared object is provided an attribute. In an embodiment, the shared object is a container-type shared object (e.g., a directory). The attribute indicates any object (e.g., file or directory) created in this shared object from this point in time will be a node-specific object. Assuming the shared object is a shared directory (e.g., Directory1 of FIG. 3A), any object (e.g., file or directory) created in this shared directory (which includes its sub-directories (or sub-containers)) from this point in time will be a node-specific object. This allows preserving as shared files or directories those files or directories which existed in the shared directory before the point in time when the shared directory was made node-specific. Any file or directory created after this point in time in the shared directory (which includes its sub-directories) becomes a node-specific object, enabling shared files and directories and node-specific files and directories to reside in the same shared directory.

Figure 3A:
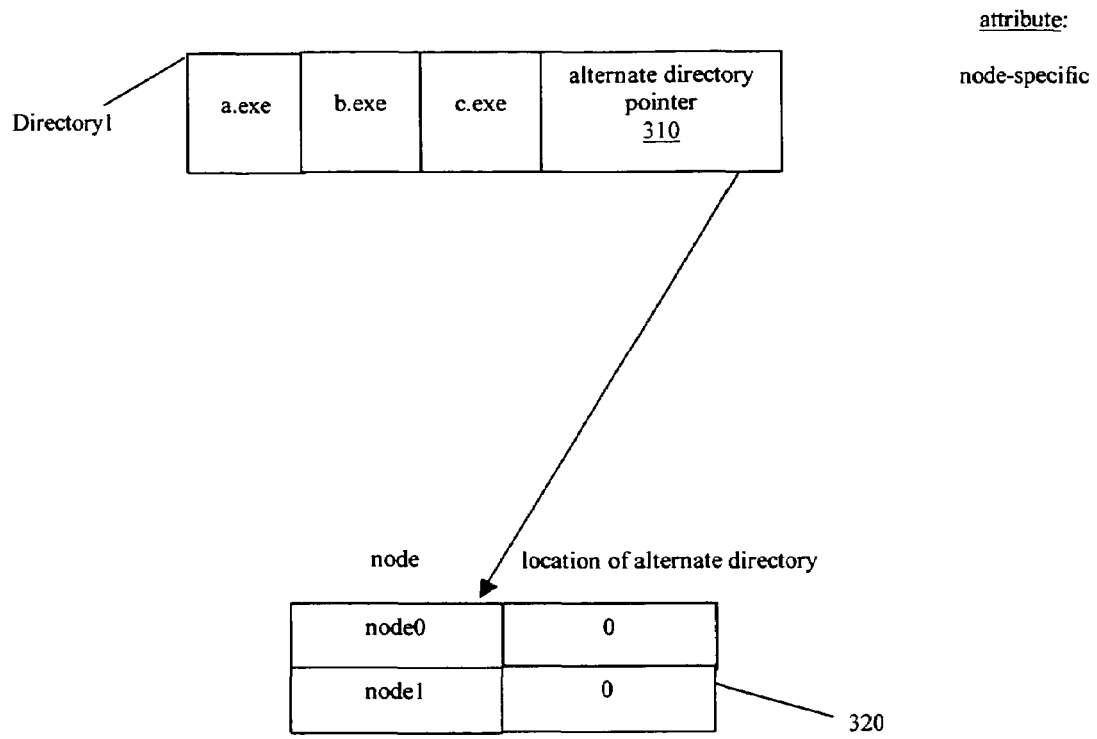
FIG. 3A-3C illustrates operation of a cluster file system in accordance with an embodiment of the present invention.

In FIG. 3A, the shared object Directory1 is given the attribute that indicates node-specific. The Directory1 has files a.exe, b.exe, and c.exe, which are shared objects. Although Directory1 is given the node-specific attribute, the Directory1 retains its status as a shared object. However, any new object (e.g., file or directory) created thereafter in Directory1 is a node-specific object. This allows products (e.g., applications) to have shared objects and node-specific objects reside in the same shared object. For example, shared files and node-specific files can reside in the same directory.

As shown in FIG. 3A, the Directory1 has an alternate directory pointer 310 that points to a table 320 that has alternate directory information for each node (e.g., node0 and node1). In particular, the table 320 indicates the location of the alternate directory associated with a node, if the alternate directory has been created by the cluster file system 20. The value 0 in the table 320 in the column for location of the alternate directory indicates that the alternate directory for the node has not been created by the cluster file system 20. Each alternate directory is private to the corresponding node and is associated with the shared directory Directory1.

Moreover, at Step 230, a node (e.g., node0) accesses the shared file c.exe in the Directory1 (shared object that has the node-specific attribute) causing a file system operation that is node-specific to be performed by the cluster file system 20. For example, node0 may create a file or directory that has to be node-specific. Also, node0 may modify a file or directory that is node-specific. Additionally, node0 may delete a file or directory that is node-specific.

Figure 3B:
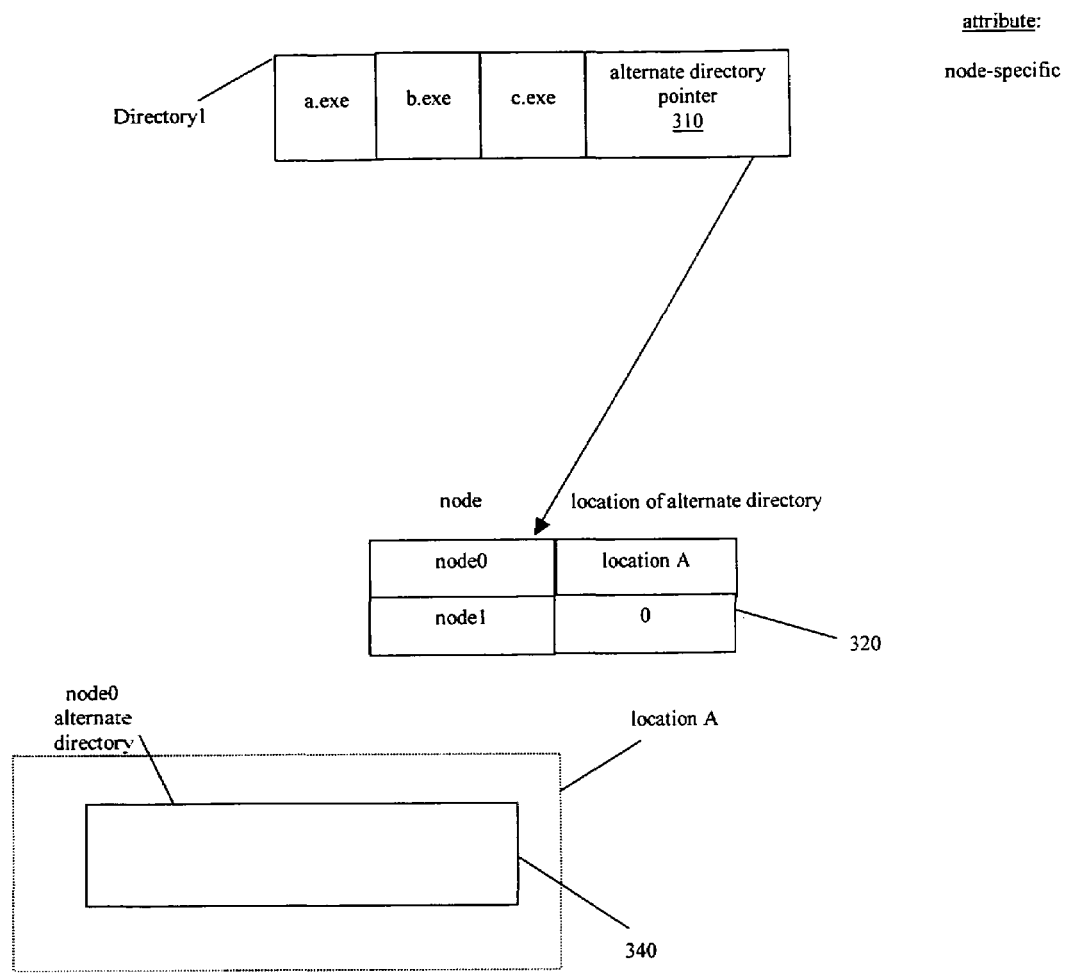

At Step 240, the cluster file system 20 determines whether the table 320 has the location of the alternate directory. If the table 320 indicates that the alternate directory has not been created for node0, at Step 250, the cluster file system 20 creates the alternate directory for node0. Further, at Step 260, the cluster file system 20 updates the table 320 with the location (e.g., location A) of the alternate directory for node0. FIG. 3B shows the node0 alternate directory 340 created at location A.

Figure 3C:
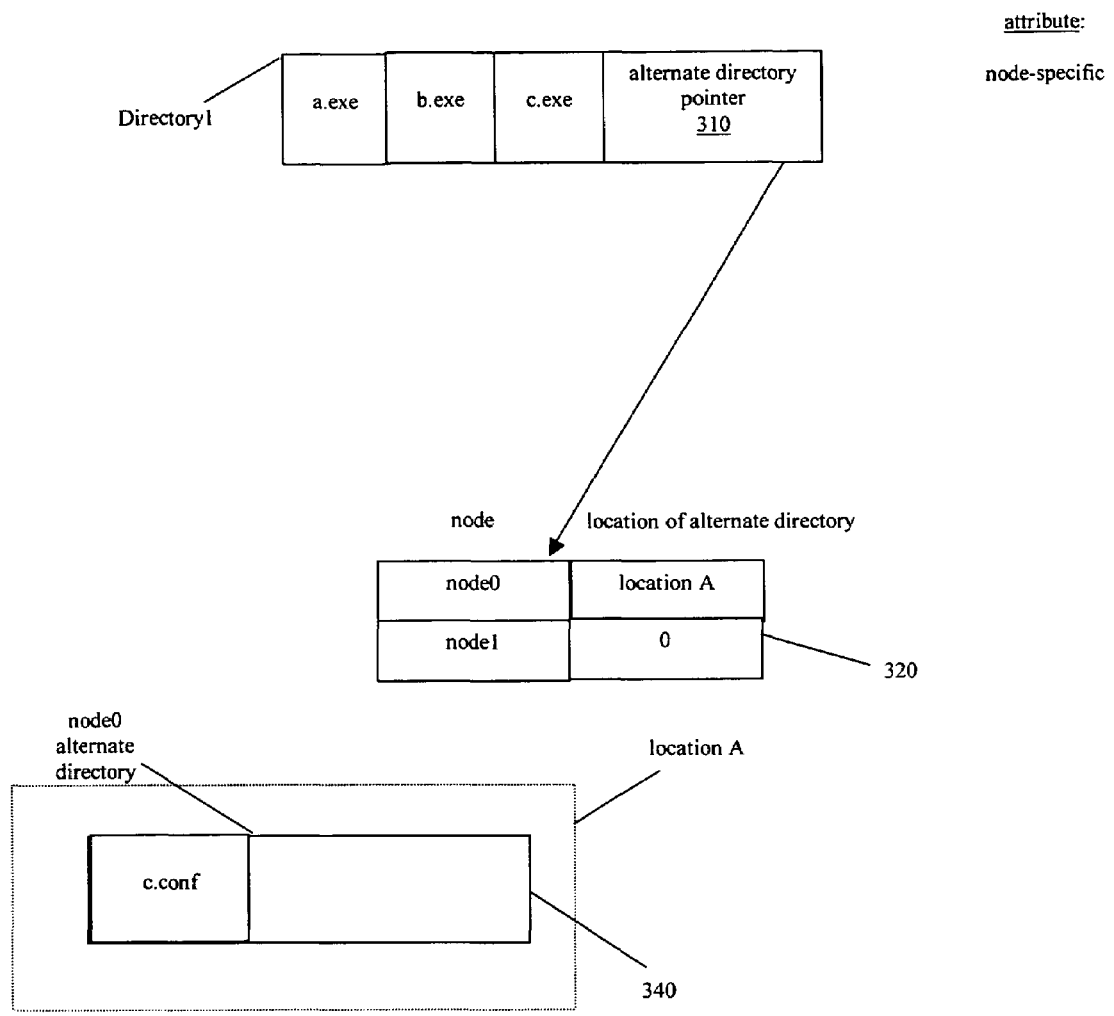

Moreover, at Step 270, the cluster file system 20 performs the file system operation in the node0 alternate directory 340. Here, the cluster file system 20 puts the created file c.conf (which is a configuration file) in the node0 alternate directory 340, as illustrated in FIG. 3C. Thus, this internal branching from the Directory1 to the node0 alternate directory 340 facilitates the node-specific functionality of the cluster file system 20.

Now, if a directory search is performed from node0, the result will show the shared objects a.exe, b.exe, and c.exe. Moreover, the result will also show the node-specific-object c.conf, which is specific to node0.

However, if a directory search is now performed from node1, the result will show the shared objects a.exe, b.exe, and c.exe. However, the result will not show the node-specific-object c.conf, which is specific to node0, but not to node1.

Thus, each node sees the shared objects of the Directory1 and the node-specific objects in the alternate directory corresponding to the node. It should be understood that there can be a plurality of shared directories, each supporting the creation of node-specific objects as described above in the case of the shared object Directory1. Each sub-directory (sub-container) of a directory which has been given the node-specific attribute exhibits behavior of a similar nature in that any new files or directories created in the sub-directory becomes node-specific. Thus, a time based branching of a whole directory tree is possible using this invention whereby a part of the tree which existed before the parent directory of the tree was made node-specific remains shared to all current as well as future nodes and any files or directories created after this point in time (when given the node-specific attribute) in this directory tree will become specific to the node which created it.

In an embodiment, the invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of providing shared objects and node-specific objects in a cluster file system, said method comprising:
    installing a particular shared object in said cluster file system;
    at a point in time after said installation, providing to said particular shared object an attribute that indicates any object created in said particular shared object after said point in time is designated as node-specific while any object existing in said particular shared object prior to said point in time maintains designation as shared, wherein any object designated as shared in said particular shared object is available to a plurality of nodes; and
    when a node in the plurality of nodes causes a file system operation that is node-specific to be performed by accessing said particular shared object, performing said file system operation in an alternate directory corresponding to said node, wherein said alternate directory supports a node-specific object that is available solely to the corresponding node of said nodes; and
    using a pointer associated with said particular shared object to access alternate directory location information for the alternate directory, said alternate directory location information stored in a table having alternate directory location information for each node and wherein said performing said file system operation in said alternate directory includes creating said alternate directory for said node and updating said table with a location of said alternate directory if said alternate directory information for said node indicates that said alternate directory has not been created.

2. The method as recited in claim 1 wherein said particular shared object is a container-type shared object.

3. The method as recited in claim 1 wherein said particular shared object is a directory.

4. The method as recited in claim 1 wherein said file system operation that is node-specific includes creating one of a node-specific file and a node-specific directory.

5. The method as recited in claim 4 wherein said file system operation that is node-specific includes modifying one of said node-specific file and said node-specific directory.

6. The method as recited in claim 4 wherein said file system operation that is node-specific includes deleting one of said node-specific file and said node-specific directory.

7. A computer-readable medium comprising computer-executable instructions stored therein for performing a method of providing shared objects and node-specific objects in a cluster file system, said method comprising:
    installing a particular shared object in said cluster file system;
    at a point in time after said installation, providing to said particular shared object an attribute that indicates any object created in said particular shared object after said point in time is designated as node-specific while any object existing in said particular shared object prior to said point in time maintains designation as shared, wherein any object designated as shared in said particular shared object is available to a plurality of nodes; and
    when a node in the plurality of nodes causes a file system operation that is node-specific to be performed by accessing said particular shared object, performing said file system operation in an alternate directory corresponding to said node, wherein said alternate directory supports a node-specific object that is available solely to the corresponding node of said nodes; and
    using a pointer associated with said particular shared object to access alternate directory location information for the alternate directory, said alternate directory location information stored in a table having alternate directory location information for each node and wherein said performing said file system operation in said alternate directory includes creating said alternate directory for said node and updating said table with a location of said alternate directory if said alternate directory information for said node indicates that said alternate directory has not been created.

8. The computer-readable medium as recited in claim 7 wherein said particular shared object is a container-type shared object.

9. The computer-readable medium as recited in claim 7 wherein said particular shared object is a directory.

10. The computer-readable medium as recited in claim 7 wherein said file system operation that is node-specific includes creating one of a node-specific file and a node-specific directory.

11. The computer-readable medium as recited in claim 10 wherein said file system operation that is node-specific includes modifying one of said node-specific file and said node-specific directory.

12. The computer-readable medium as recited in claim 10 wherein said file system operation that is node-specific includes deleting one of said node-specific file and said node-specific directory.

13. A system comprising:
    a cluster having a plurality of nodes;
    a mass storage device coupled to said cluster; and
    a cluster file system configured to install a shared object and to automatically provide support for node-specific objects in said shared object, said cluster file system including a shared directory supporting said shared objects, wherein at a point in time after installation of said shared object, said cluster file system provides to said shared object an attribute that indicates any object created in said shared object after said point in time is designated as node-specific while any object existing in said shared object prior to said point in time maintains designation as shared, wherein any object designated as shared in said shared object is available to said plurality of nodes, wherein when one of said nodes in the plurality of nodes causes a file system operation that is node-specific to be performed by accessing said shared object, said cluster file system performs said file system operation in an alternate directory corresponding to said node and supporting a node-specific object that is available solely to the corresponding node of said plurality of nodes, wherein said cluster file system uses a pointer associated with said shared object to access alternate directory location information for the alternate directory, said alternate directory location information stored in a table having alternate directory location information for each node, and wherein said cluster file system creates said alternate directory for said node and updates said table with a location of said alternate directory if said alternate directory information for said node indicates that said alternate directory has not been created.

14. The system as recited in claim 13 wherein said alternate directory supports a node-specific object.

15. The system as recited in claim 14 wherein said file system operation that is node-specific includes creating one of a node-specific file and a node-specific directory.

16. The system as recited in claim 15 wherein said file system operation that is node-specific includes modifying one of said node-specific file and said node-specific directory.

17. The system as recited in claim 15 wherein said file system operation that is node-specific includes deleting one of said node-specific file and said node-specific directory.

18. The system as recited in claim 13 wherein said shared object is a container-type shared object.

19. The system as recited in claim 13 wherein said shared object is a directory.

* * * * *

UNITED STATES PATENT AND TRADEMARK OFFICE
CERTIFICATE OF CORRECTION

PATENT NO.       : 7,657,529 B2
APPLICATION NO.  : 10/810174
DATED            : February 2, 2010
INVENTOR(S)      : Kaura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 294 days.

Signed and Sealed this

Thirtieth Day of November, 2010

David J. Kappos
*Director of the United States Patent and Trademark Office*